July 28, 1925.

M. GOODRICH

CONTROL SWITCH FOR HEADLIGHTS

Filed Nov. 11, 1922 2 Sheets-Sheet 1

1,547,745

WITNESSES

INVENTOR
Max Goodrich,
BY
ATTORNEYS

July 28, 1925.

M. GOODRICH

CONTROL SWITCH FOR HEADLIGHTS

Filed Nov. 11, 1922

WITNESSES

INVENTOR
Max Goodrich,
BY
ATTORNEYS

Patented July 28, 1925.

1,547,745

UNITED STATES PATENT OFFICE.

MAX GOODRICH, OF CHARLOTTE, MICHIGAN.

CONTROL SWITCH FOR HEADLIGHTS.

Application filed November 11, 1922. Serial No. 600,465.

*To all whom it may concern:*

Be it known that I, MAX GOODRICH, a citizen of the United States, and a resident of Charlotte, in the county of Eaton and State of Michigan, have invented certain new and useful Improvements in Control Switches for Headlights, of which the following is a specification.

This invention relates to a control switch for headlights on motor vehicles or the like.

The object of the invention is to provide a switch of the above character which may be operated by a foot of the driver of a motor vehicle with which the switch may be associated for dimming the headlights.

It is also an object of the invention that the switch may be operated to control a spotlight or other auxiliary lamp which may be associated with a motor vehicle.

A further and important object of the invention is that the control switch be adapted to be easily mounted in the bottom of a motor vehicle and so supported without interfering with the operation of the motor vehicle in any manner.

A still further object of the invention is that the switch be positive in operation and easy to manipulate.

Other objects, and objects relating to details of construction, combination and arrangement of parts will hereinafter appear in the detailed description to follow.

The invention is illustrated by way of example in the accompanying drawings, in which:—

Like reference numerals refer to like parts through the different views of the drawings.

Figure 1:
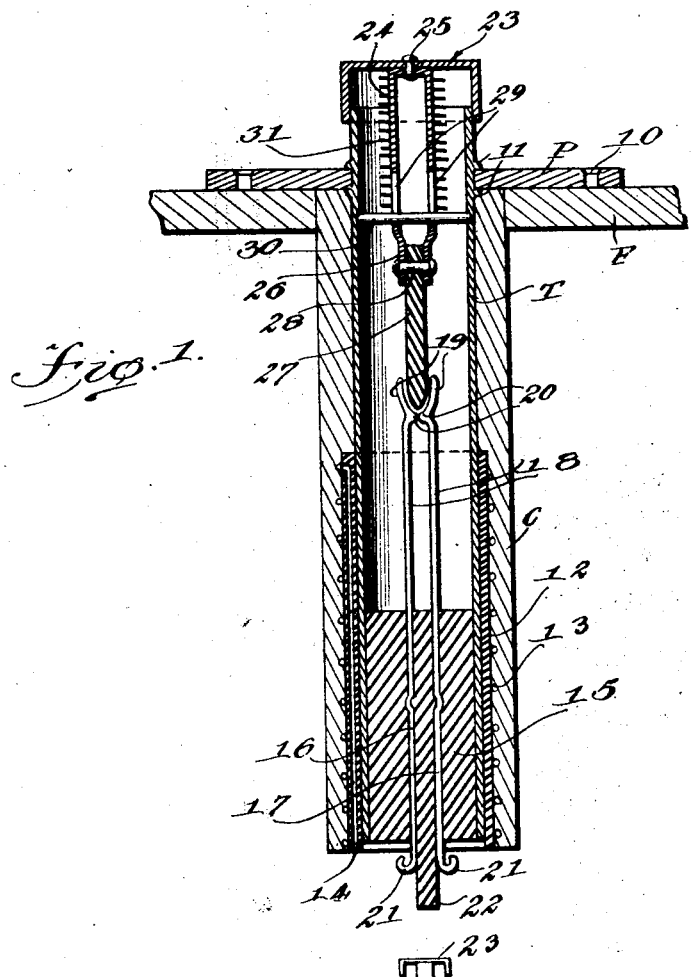
Figure 1 is a vertical sectional view taken through the controlling switch when mounted to the floor of a motor vehicle.
Figure 3:
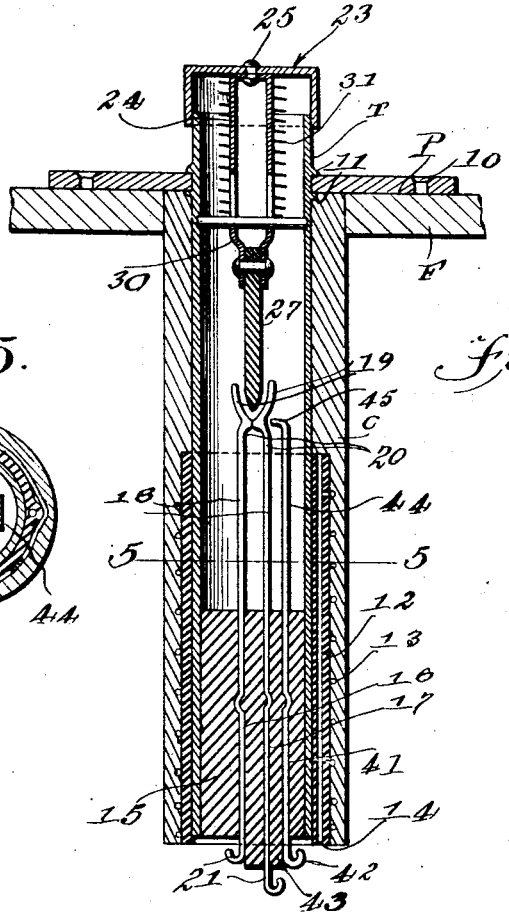
Figure 3 is a view similar to Figure 1 but showing a slightly modified form of the invention.

Referring to the drawings in details and particularly to Figures 1 and 3, F indicates generally a floor of a motor vehicle, or the like, upon which there is mounted a plate P, said plate being held in position by screws 10 and having a central opening adapted to receive the tubular member T. Upon the exterior surface of the tubular member there is formed a pair of lips or flanges 11 whereby the plate P may support the tubular member T. The tubular member T also extends through a suitable opening in the floor F as shown, and surrounding this tubular member is a cylindrical casing C which is of insulating material. The bore within the cylindrical member C is enlarged at its lower end to accommodate a sleeve 12 also of insulating material, and about this sleeve there is wrapped a continuous wire 13 to provide a resistance coil, said wire being preferably embedded in the member C as shown to advantage in Figures 1 and 3. The sleeve 12 may have a duct extending as at 14 substantially the entire length thereof through which one end portion of the wire 13 may be extended for a purpose which will later be described.

Within the lower end of the tubular member T there is positioned a plug 15 which is of insulating material and which has extending longitudinally therethrough a pair of spring members 16 and 17, respectively, each member terminating at its upper end in an extension or spring finger 18 which in turn terminates in a jaw 19. The jaws 19 are opposed to each other and each jaw having formed at its inner end an inward projection 20 adapted to limit the inward movement of said spring fingers and also adapted to establish an electrical connection therebetween. The lower end of each member 16 and 17 terminates in an extension 21 which is curved outwardly and upwardly, as shown, and between these extensions a lug 22 formed upon the lower end of the plug 15 is extended in order to retain these extensions in their separated positions and insulated from each other.

Upon the upper end of the tubular member T there is slidably fitted a cap 23, said cap having secured to its lower face centrally thereof a plunger 24. The plunger 24 is hollow, as shown, and its upper end secured by the means of a rivet or the like as at 25 to the head of the cap 23, while its lower end is formed with a reduced portion as at 26, and within this reduced portion there is secured the upper end of a pin 27, said pin being of insulating material and being held in the lower end of the plunger 24 by the means of a rivet or the like as at 28. The lower end of the pin 19 is adapted to enter between the jaws 19 of the spring fingers 18 and upon this pin being pressed downwardly the same is adapted to operate the spring fingers 18 and thereby break the contact between their protrusions or projections 20.

The hollow plunger 24 is also provided with a pair of diametrically opposed slots as at 29 through which there is extended a pin 30, said pin being secured to the inner side walls of the tube T. The slots 29 are of sufficient length to permit relative upward and downward movement of the plunger 24 with respect to the pin 30, and the pin is for the purpose of maintaining the plunger 24 in proper alignment within the tubular member T.

Between the cap 23 and the pin 30 there is interposed a compression spring 31 which is adapted to yieldingly retain the plunger in its raised position.

Figure 2:
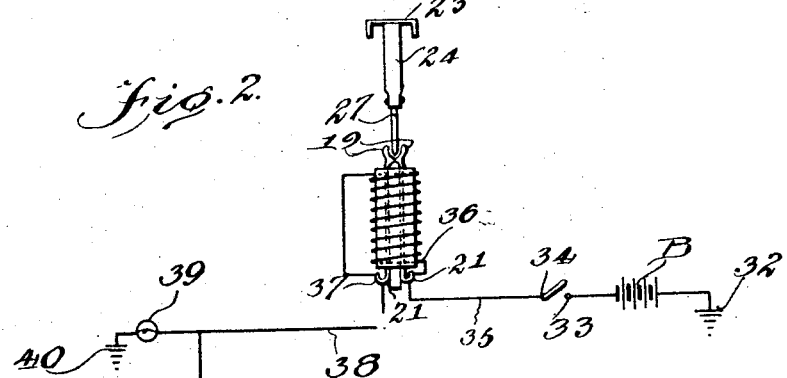
Figure 2 is a diagrammatic view illustrating the connection of the control switch, shown in Figure 1, with the headlights of the associated motor vehicle and the current supply for said headlights.
Figure 5:
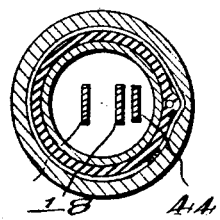
Figure 5 is a transverse sectional view taken substantially on the lines 5—5 of Figure 3.

In applying the present invention, the same is mounted, as shown, in the bottom or floor of a motor vehicle. A motor vehicle having an electrical system for lighting its headlights usually employs a switch located upon its instrument board whereby to energize the lamp of the headlights when desired. In Figure 2, B generally indicates a battery which is grounded upon its one side as at 32, while its other side is connected through a lead to the contact point 33 of a switch plate 34. This plate is mounted upon the instrument board as before referred to, and in the present instance, is permanently connected through a wire 35 to the extension 21 of the member 17. The wire 13 has its one end connected to the extension 21 of the member 17 as at 36, while its other end is connected to the similar extension 21 as at 37. The extension 21 of the member 16 is also connected through a wire 38 to one side of the two headlights 39. The other side of each headlight 39 is grounded as at 40.

In the operation of the present control switch normally the spring fingers 18 engage each other, and with the switch 34 closed current from the battery B will proceed through these spring fingers 18 to fully illuminate the lens 39. When it is desired to dim these lights, then the plunger 24 is depressed whereby to spread apart the free ends of the spring fingers 18 and then cause a current to flow through the resistance wire 13, thus interposing a resistance in the electrical circuits of the lamps 39 and dimming the same.

Figure 4:
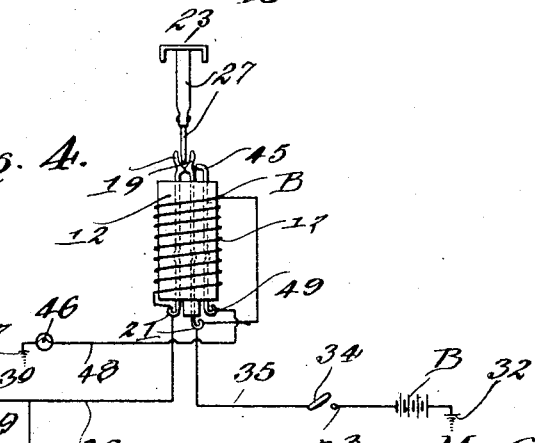
Figure 4 is a view similar to Figure 2 showing the connections for the control switch disclosed in Figure 3.

The description heretofore given of the particular switch control and connecting means therefor, is entirely applicable to the structure shown in Figures 3 to 4 inclusive, and hence this part of the structure of these figures will not be repeated.

As seen in Figure 3, the plug 15 has embedded therein a third spring member 41 which likewise terminates at its lower end in an extension 42 and which is properly spaced from the adjacent extension of the member 17 by a protrusion from the member 15 as at 43. It will be noted that in this instance, the member 17 has its lower end extended slightly beyond the members 16 and 41. The member 41 is also formed at its upper end with a spring finger portion as at 44 which terminates in an inwardly extending portion 45. As is obvious by pressing downwardly upon the plunger to separate the spring fingers 18 the finger 44 will be engaged by the adjacent spring finger 18 for establishing an electrical connection therebetween.

Referring to Figure 4, an additional light as at 46 is shown which may be a spotlight and which is grounded upon its one side as at 47, while its other side is connected to a wire 48 with the lower end extension 42 of the member 41 as at 49. The remainder of the electrical connections for this form of switch are the same as that described for Figures 1 and 2.

When using the form of switch shown in Figures 2 to 4 inclusive, the upper ends of the spring fingers 18 are normally together and thereby as long as the switch 34 is closed the lamps 39 are energized. Upon pressing downwardly upon the plunger 24 the one spring finger 18 will engage with the member 44 and establish an electrical connection therewith. Upon this occurring the electric current will proceed through the light 46 in an obvious manner and also an electrical current will proceed from the battery B through wire 17 and through lights 39. It now should be observed that the headlights are dimmed and the auxiliary spotlight energized upon the plunger 24 being depressed in this particular form of switch.

It is to be understood, that while I have shown one particular application of my invention, that I am aware of the fact that my form of switch may be used in conjunction with other electrical circuits for controlling the same without departing from the spirit of my invention, as indicated by the appended claims.

I claim:

1. A control switch of the character described, comprising a supporting member of insulating material, a pair of spring fingers extending therefrom and adapted to normally engage each other for establishing an electrical circuit, a resistance coil, means whereby upon said spring fingers being disengaged, said resistance coil will be interposed in the circuit, and a third spring finger adapted to be engaged by one of the first named spring fingers when separated for establishing an auxiliary electrical circuit for the purpose described.

2. In combination, a supporting member, a tubular member extending downwardly therefrom, an insulating plug supported in the lower end of said tubular member, a pair of spring fingers extending upwardly from said insulating plug adapted to normally engage one another for establishing an electrical circuit, a spring pressed plunger carried within the upper end of the tubular member and adapted to be depressed for separating said spring fingers, a resistance coil adapted to be connected in series with said circuit when said spring fingers are separated, and a third spring finger extending upwardly from said insulating plug and adapted to be engaged by one of said spring fingers when separated for establishing an auxiliary circuit.

MAX GOODRICH.